US012789462B2

(12) United States Patent
John

(10) Patent No.: US 12,789,462 B2
(45) Date of Patent: Nov. 10, 2026

(54) AUTOMATIC COMPONENT REMOVAL

(71) Applicant: Ivoclar Vivadent AG, Schaan (LI)

(72) Inventor: Hendrik John, Buchs (CH)

(73) Assignee: Ivoclar Vivadent AG, Schaan (LI)

( * ) Notice: Subject to any disclaimer, the term of this patent is extended or adjusted under 35 U.S.C. 154(b) by 72 days.

(21) Appl. No.: 18/620,660

(22) Filed: Mar. 28, 2024

(65) Prior Publication Data

US 2024/0326336 A1 Oct. 3, 2024

(30) Foreign Application Priority Data

Mar. 30, 2023 (EP) .................................... 23165467

(51) Int. Cl.

| | |
|---|---|
| ***B29C 64/379*** | (2017.01) |
| ***B29C 64/245*** | (2017.01) |
| ***B29C 64/295*** | (2017.01) |
| ***B29C 64/35*** | (2017.01) |
| ***B29C 64/40*** | (2017.01) |
| ***B33Y 10/00*** | (2015.01) |
| ***B33Y 30/00*** | (2015.01) |

(52) U.S. Cl.
CPC .......... *B29C 64/379* (2017.08); *B29C 64/245* (2017.08); *B29C 64/295* (2017.08); *B29C 64/35* (2017.08); *B29C 64/40* (2017.08); *B33Y 10/00* (2014.12); *B33Y 30/00* (2014.12)

(58) Field of Classification Search
CPC .............................. B29C 64/379; B29C 64/40
See application file for complete search history.

(56) References Cited

U.S. PATENT DOCUMENTS

| | | | | |
|---|---|---|---|---|
| 2012/0018115 | A1* | 1/2012 | Hovel | B22F 12/13 164/492 |
| 2013/0228953 | A1* | 9/2013 | Ikeda | B29C 64/40 264/401 |
| 2014/0178585 | A1* | 6/2014 | Swanson | B05C 13/00 427/256 |
| 2015/0314527 | A1* | 11/2015 | Kline | B33Y 30/00 425/447 |
| 2016/0288416 | A1* | 10/2016 | Robles Flores | B29C 64/393 |
| 2018/0117844 | A1* | 5/2018 | Sieradzki | B29C 64/295 |
| 2021/0221067 | A1 | 7/2021 | Sieradzki | |

* cited by examiner

*Primary Examiner* — Timothy Kennedy
(74) *Attorney, Agent, or Firm* — Ann M. Knab; Thad McMurray

(57) ABSTRACT

A method for printing a three-dimensional component (101), including the steps of heating (S101) a build platform to melt a material component to form a sliding film between the component and the build platform; and removing (S102) the component (101) from the build platform.

12 Claims, 8 Drawing Sheets

AUTOMATIC COMPONENT REMOVAL

CROSS-REFERENCE TO RELATED APPLICATIONS

This application claims priority to European patent application No. 23165467.4 filed on Mar. 30, 2023, which disclosure is incorporated herein by reference in its entirety.

TECHNICAL FIELD

The present invention relates to a method for printing a three-dimensional component, a build platform for a printing device and a printing device for printing a three-dimensional component.

BACKGROUND

With the currently known inkjet 3D printers, the printed components are removed from the build platform using a spatula or other mechanical means; this is done while the build platform remains in the printer or after removing the build platform from the printer. The build platform is then cleaned and, if necessary, reinserted into the printer. This requires a plurality of manual work steps and causes an interruption to the workflow.

U.S. 20210221067 is directed to 3D printing and is incorporated herein by reference.

SUMMARY

It is the technical task of the present invention to automatically remove the finished printed components from the build platform after printing is complete, thus making the build platform ready for the subsequent printing process.

This task is solved by subject matter according to the independent claims. Technically advantageous embodiments are the subject of the dependent claims, the description and the drawings.

According to a first aspect, the technical task is solved by a method for printing a three-dimensional component, comprising the steps of heating a build platform to melt a material component to form a sliding film between the component and the build platform; and removing the component from the build platform. The method enables continuous printing of components without manual intervention.

In a technically advantageous embodiment of the method, the material component is integrated into a support structure of the component. This provides the technical advantage, for example, that a sliding film can be easily created beneath the component when the build platform is heated.

In a further technically advantageous embodiment of the method, the material component is applied to the build platform. This provides the technical advantage, for example, that non-meltable support structure material can also be used.

In a further technically advantageous embodiment of the method, the meltable material component is arranged extensively over the entire build platform or extends over the entire build platform or selectively beneath the component or in positions beneath a component to be printed. This also provides the technical advantage, for example, that the component can be built up at different points on the build platform.

In a further technically advantageous embodiment of the method, the selective application of the meltable material component is carried out by an integrated inkjet module. This provides the technical advantage, for example, that the existing inkjet module can be used for application. In general, however, a stereolithography module, a fused deposition modeling (FDM) module or any other module that is suitable for applying the meltable material component can also be used.

In a further technically advantageous embodiment of the method, the component is pushed off the build platform on the sliding film. This provides the technical advantage, for example, that the component can be efficiently removed from the build platform.

In a further technically advantageous embodiment of the method, the meltable material component comprises polyethylene glycol, polyvinyl acetate, paraffin or wax. This provides the technical advantage, for example, that the material starts to melt easily.

In a further technically advantageous embodiment of the method, the meltable material component is removed from the build platform after removal of the component. This provides the technical advantage, for example, that the build platform can be used for another print job. This has the additional technical advantage that a controlled application of the meltable material component can be ensured, or the build platform can also be used for a further job without the meltable material component.

In a further technically advantageous embodiment of the method, the build platform is cooled after removal of the component. This provides the technical advantage, for example, that the build platform is available again more quickly for another print job.

In a further technically advantageous embodiment of the method, the meltable material component is removed from the component. This provides the technical advantage, for example, that the component can be further processed.

According to a second aspect, the technical task is solved by a build platform for a printing device, which comprises a heating device for melting a meltable material component to form a sliding film between the component and the build platform. The build platform achieves the same technical advantages as the method according to the first aspect.

According to a third aspect, the technical task is solved by a printing device for printing a three-dimensional component, comprising a build platform according to the first aspect. The printing device achieves the same technical advantages as the method according to the first aspect.

In a technically advantageous embodiment of the printing device, the printing device comprises an application device for applying the meltable material component to the build platform. This provides the technical advantage, for example, that the build platform can be automatically provided with the meltable material component.

In a further technically advantageous embodiment of the printing device, the printing device comprises a pushing device for pushing the component off the build platform. This provides the technical advantage, for example, that the component can be removed quickly. In addition, it may be provided that a support structure is provided between the component and the build platform, which can also come into play as in the above-mentioned technical advantage and thus the component together with the support structure can be removed automatically.

In a further technically advantageous embodiment of the printing device, the printing device comprises an opening in the housing for ejecting the component. After ejection, the component can be collected in a collecting container or a collecting device. This provides the technical advantage, for example, that no manual removal of the component together with the support structure from the printing device is required and thus the printing process is not disrupted.

In a further technically advantageous embodiment of the printing device, the printing device comprises a removal device for removing the sliding film from the build platform. This provides the technical advantage, for example, that the build platform is ready for a new print job.

In a further technically advantageous embodiment of the printing device, the removal device is formed by a blade. This provides the technical advantage, for example, that the meltable material component can be removed evenly or completely and the build platform is ready for the next print job.

BRIEF DESCRIPTION OF THE DRAWINGS

Exemplary embodiments of the invention are shown in the drawings and are described in more detail below, in which.

DETAILED DESCRIPTION

Figure 1:
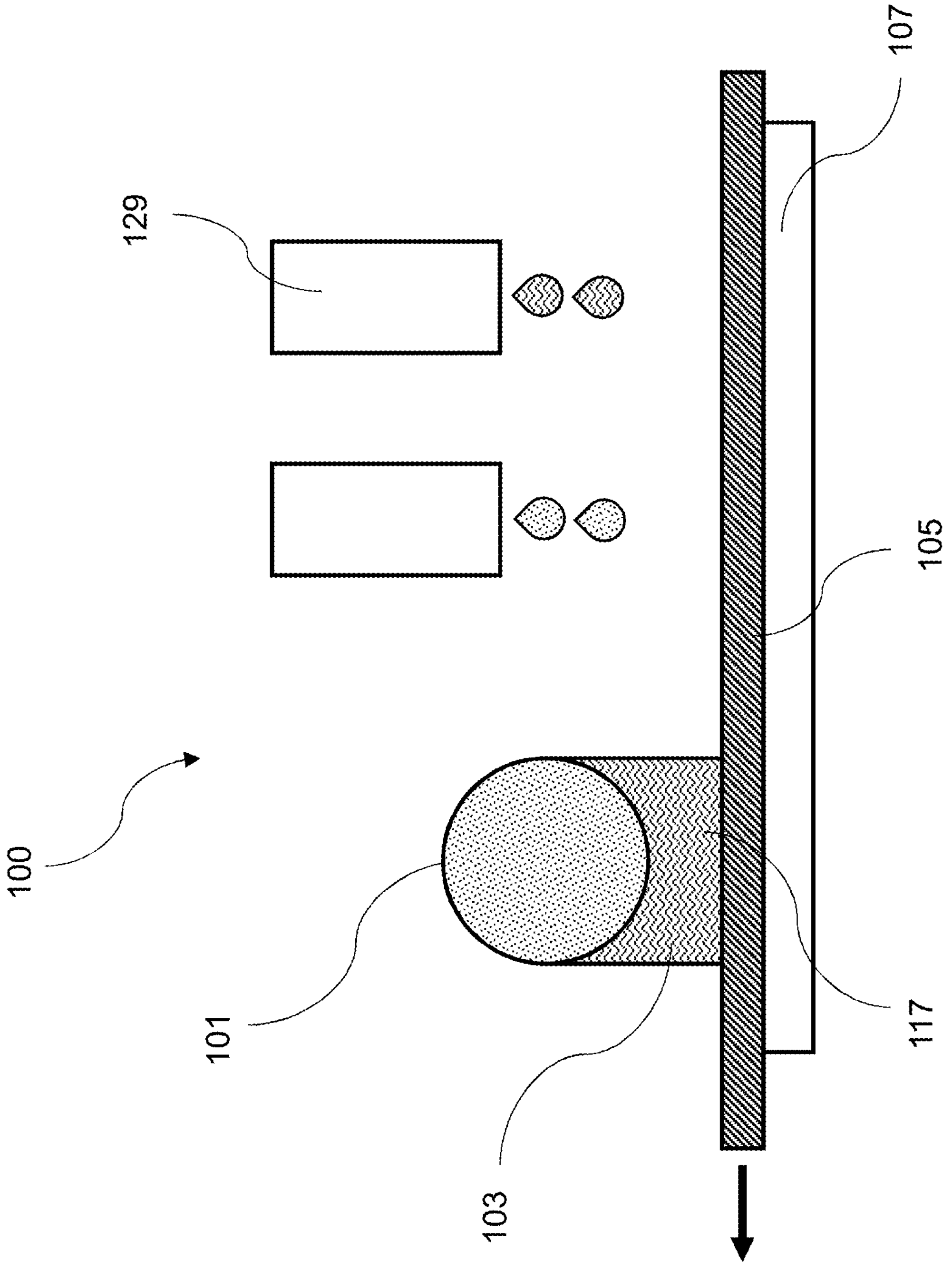
FIG. 1 shows a schematic view of a component with a support structure made of a meltable material.

FIG. 1 shows a schematic view of an object or component 101 with a support structure 103 made of a meltable material component 117. The component 101 is built up on the build platform 105 from a material that is applied by means of an inkjet process. A support structure 103 made of a meltable material component 117 is used for the component 101, which is also applied by means of the inkjet process using a printing nozzle 129. In general, however, the component 101 can also be built up using a different process.

When selecting a support material with a meltable material component 117 after printing the component 101, the build platform 105 can be heated for a short time so that the support material 103 starts to melt to form a sliding film 125 between the component 101 and the build platform 105. For this purpose, the printing device 100 comprises a heating device 107, which heats the build platform 105. The heating device 107 is, for example, an electrical heating device that is controlled by the printing device 100.

The component 101 together with the support structure 103 is then, as soon as the support material has started to melt onto the build platform surface, pushed from the build platform 105 through a hatch out of the printing device 100 into a collecting vessel by means of a squeegee.

Because the heating creates a sliding film 125 between the build platform 105 and the component 101, the force required to push the component 101 together with the support structure 103 off the build platform is minimal and the component 101 is not subjected to mechanical stress.

Figure 2:
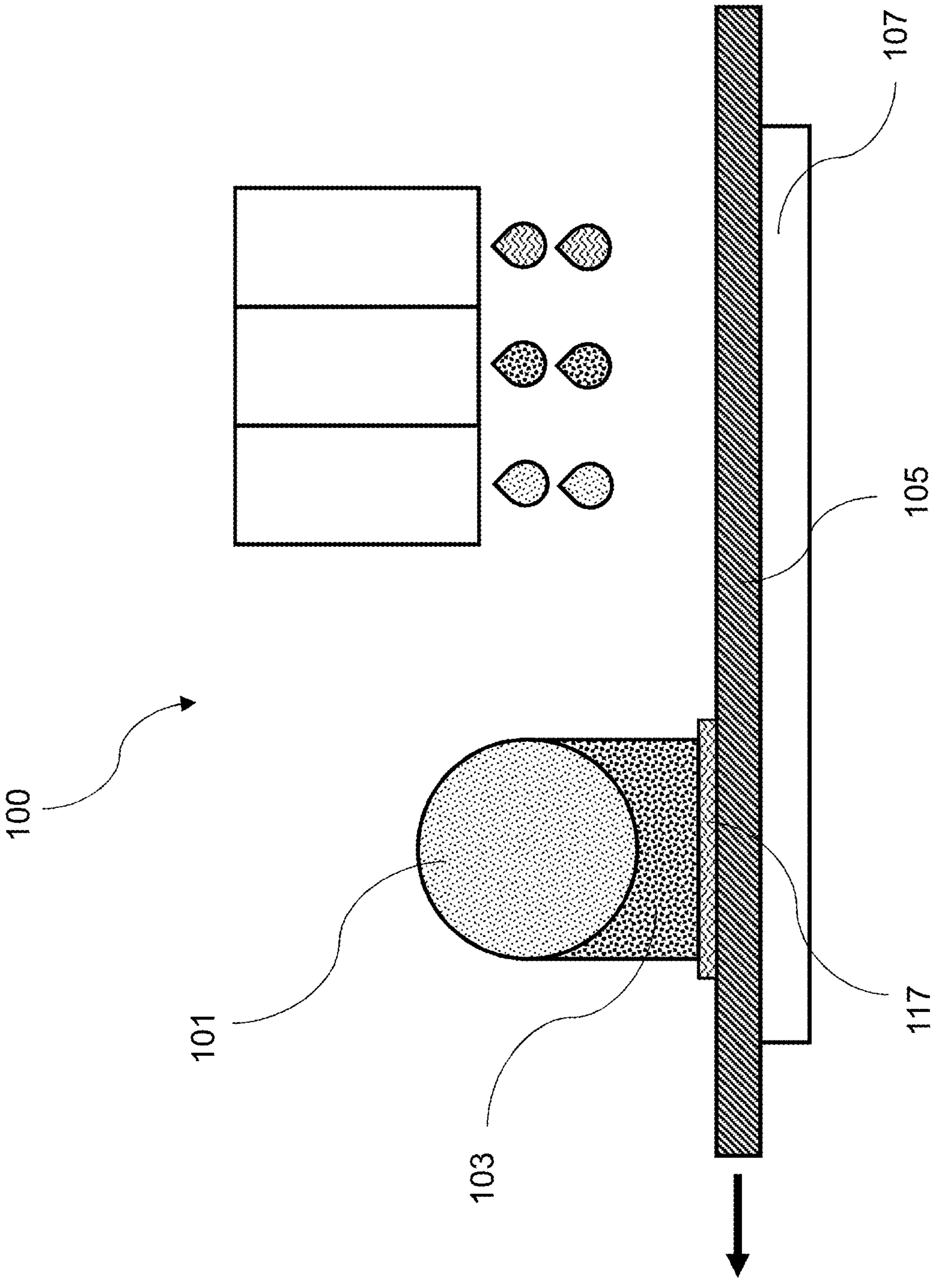
FIG. 2 shows a schematic view of a component on a meltable material applied as a layer.

FIG. 2 shows a schematic view of a component 101 on a meltable material component 117 applied as a layer. The material component 117 is applied as a layer on the build platform 105 by means of the inkjet process. The support structure 103 made of support material is built up on this layer and the component 101 made of a building material is built up on the support structure 103 using the inkjet process.

The material component 117 can also be applied thinly to the build platform 105 as a separate, meltable material. It can be applied extensively over the entire build platform 105 or selectively beneath the component 101.

Figure 3:
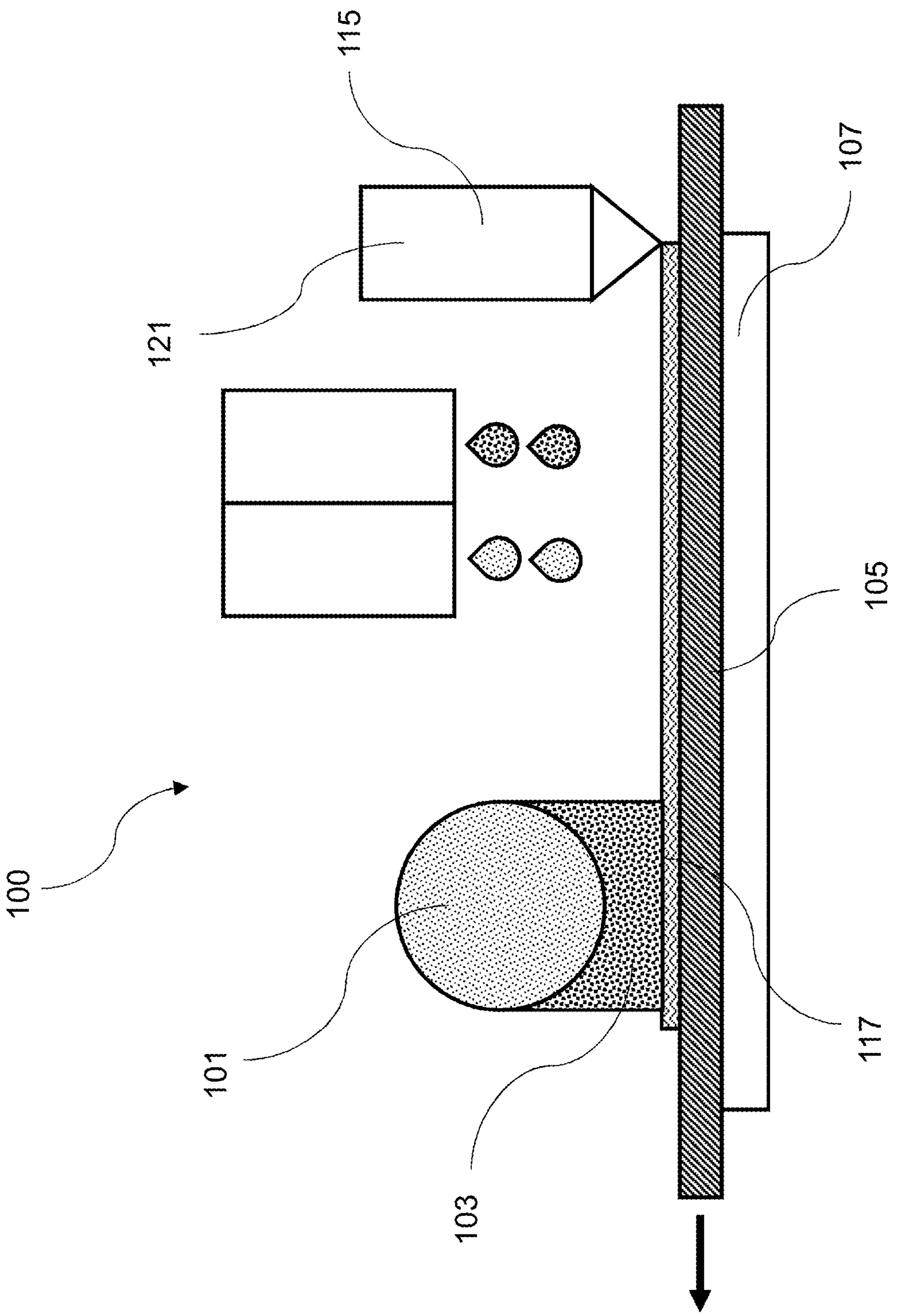
FIG. 3 shows a further schematic view of a component on a meltable material applied as a layer.

FIG. 3 shows a further schematic view of a component 101 on a meltable material component 117 applied as a layer. The material component 117 is applied extensively to the build platform 105 by means of a slot dispenser 121 as an application device 115. The support structure 103 is built up on the material component 117 by means of the inkjet process and the component 101 is built up on the support structure 103 from a building material by means of the inkjet process.

Figure 4:
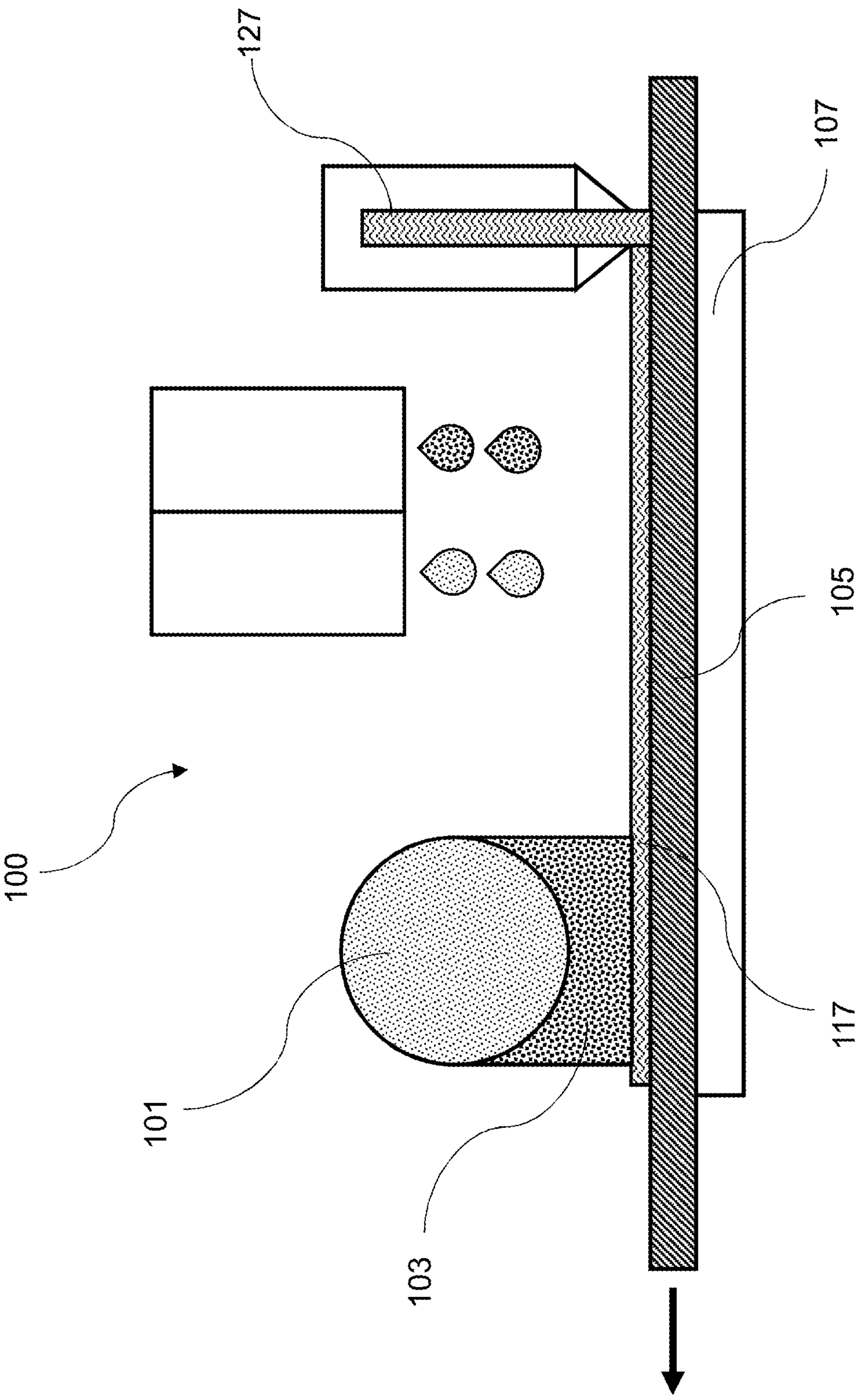
FIG. 4 shows a further schematic view of a component on a meltable material applied as a layer.

FIG. 4 shows a further schematic view of a component 101 on a meltable material component 117 applied as a layer. The material component 117 is applied extensively on the build platform 105. For this purpose, the heated build platform 105 is guided along underneath a wax plate, which is held in a shaft 127. In this way, the front or base of the wax plate melts onto the build platform 105. As a result, a thin wax film is applied to the build platform 105. The component 101 is then built up on the thin wax film by means of the component material and support material, which finally starts to melt again for automatic removal of the component 101.

Figure 5:
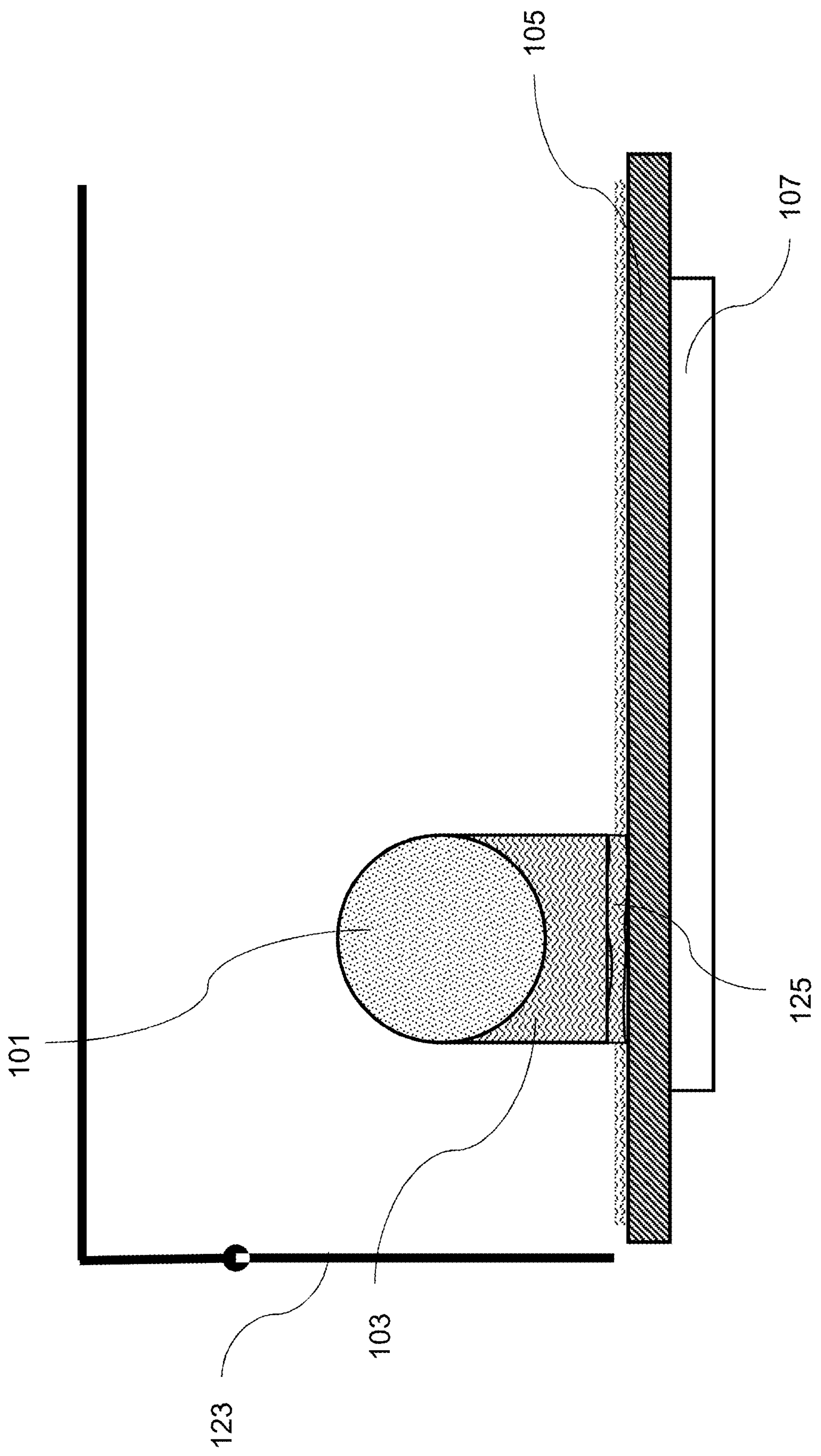
FIG. 5 shows a schematic view of a printing device with a reclosable opening.

FIG. 5 shows a printing device 100 with a reclosable opening with a rotatable flap 123. The component 101 can be moved out of the printing device 100 via the flap 123. On the temporarily heated build platform 105, the bottom layer of the support structure 103 starts to melt after completion of the print job, so that a sliding film 125 is formed from the meltable material component 117.

Figure 6:
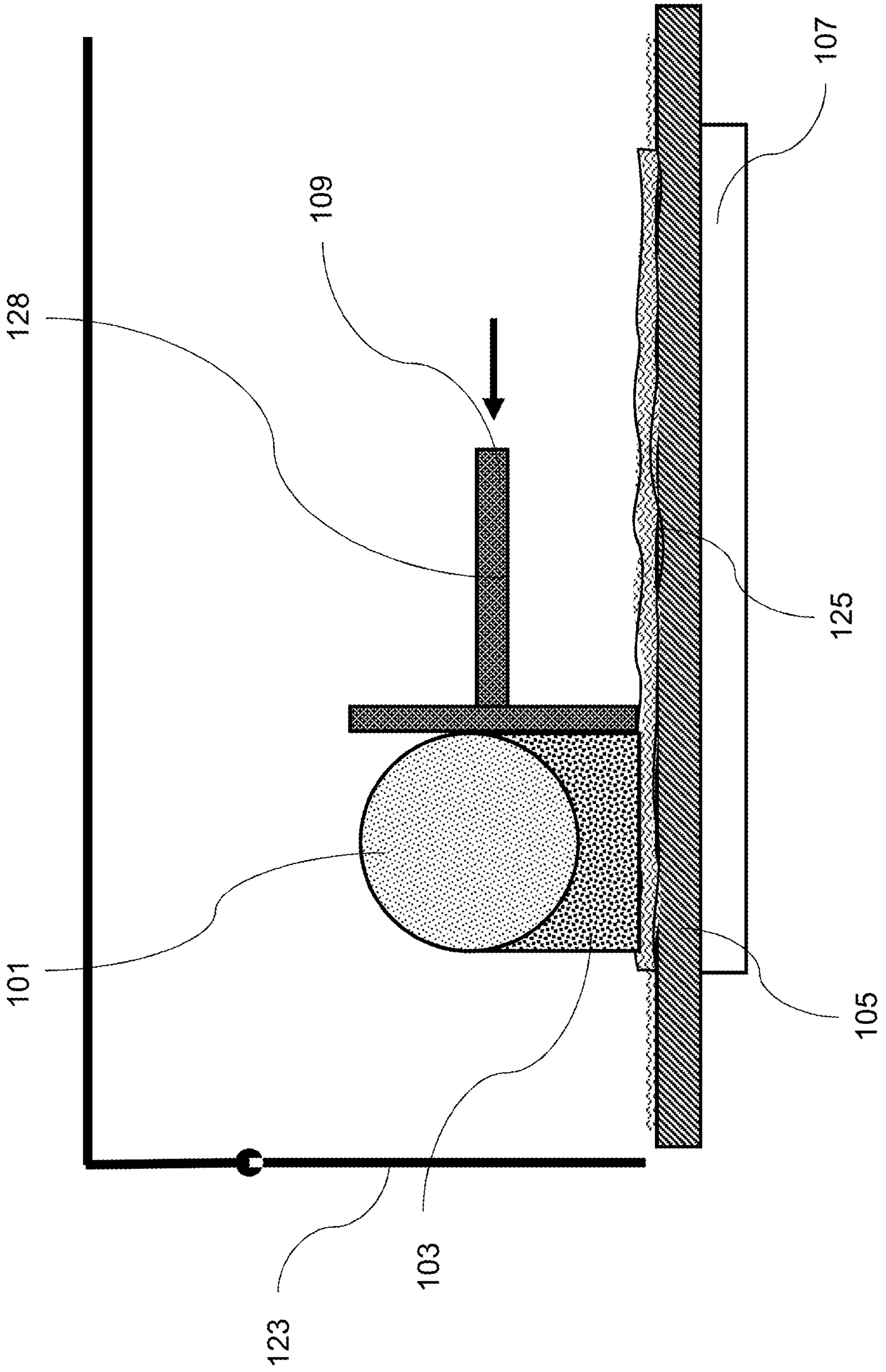
FIG. 6 shows a schematic view of a material component which has started to melt to form a sliding film.

FIG. 6 shows the material component 117 which has started to melt to become the sliding film 125 by the temporarily heated build platform 105. A squeegee 128 as an example of, but not limited to, a pushing device 109 pushes the component 101 together with the support structure 103 from the build platform 105. The pushing device 109 pushes the component 101 in a horizontal direction on the sliding film 125 made of the heated material component 117 from the build platform 105.

After removal of the component 101 by the squeegee 128, no disturbing residues of the support material remain on the build platform 105. The squeegee 128 has, for example, a blade in contact with the build platform 105, which is configured as a metal blade or a silicone blade.

Figure 7:
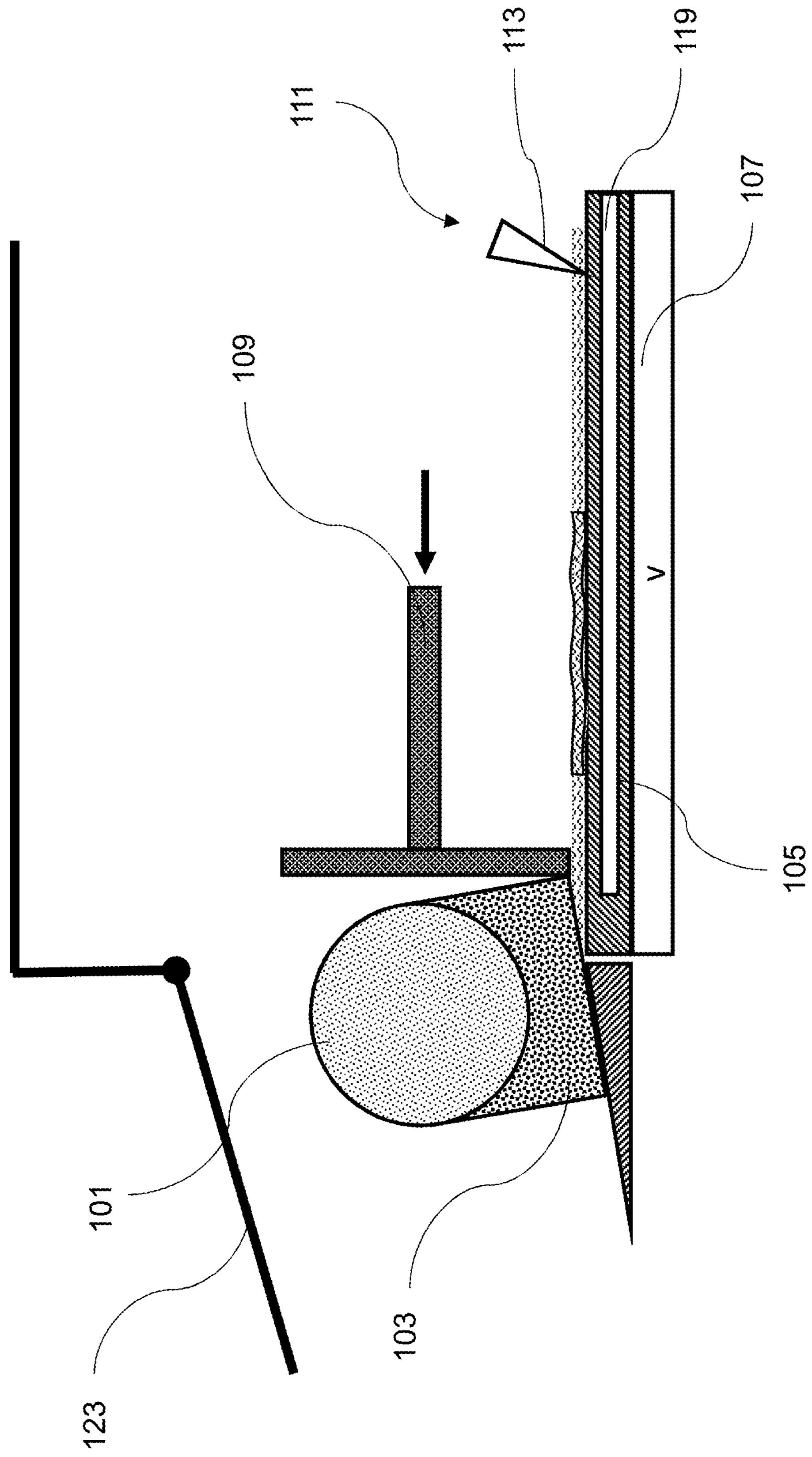
FIG. 7 shows a schematic view of a printing device with an open, reclosable opening.

FIG. 7 shows how the component together with the support structure is pushed out of the printing device 100 through the opened, reclosable flap 123 of the build platform 105. The flap 123 is arranged laterally in one of the two end positions and is automatically opened by the squeegee mechanism so that the component 101 can be conveyed undamaged from the build platform 105 out of the printing device 100.

A collecting container or a conveyor mechanism can be arranged outside the printing device 100 to collect the component 101 or to convey it to another location where it is freed from support material, cleaned and reworked, for example.

In addition, the printing device 100 comprises a removal device 111, which is formed by an elongated blade 113. The blade 113 is in contact with the build platform 105. The build platform 105 and the blade 113 are moved against each other in such a way that the sliding film 125 is stripped off. It is then possible to continue with a renewed application of the meltable material component and/or the renewed build-up of a further component 101.

The build platform 105 can be cooled after removal of the component 101 by means of a cooling device 119, such as a water circuit or a Peltier element. This allows the build platform 105 to be quickly reused for the next print job without initially forming a sliding film 125.

Figure 8:
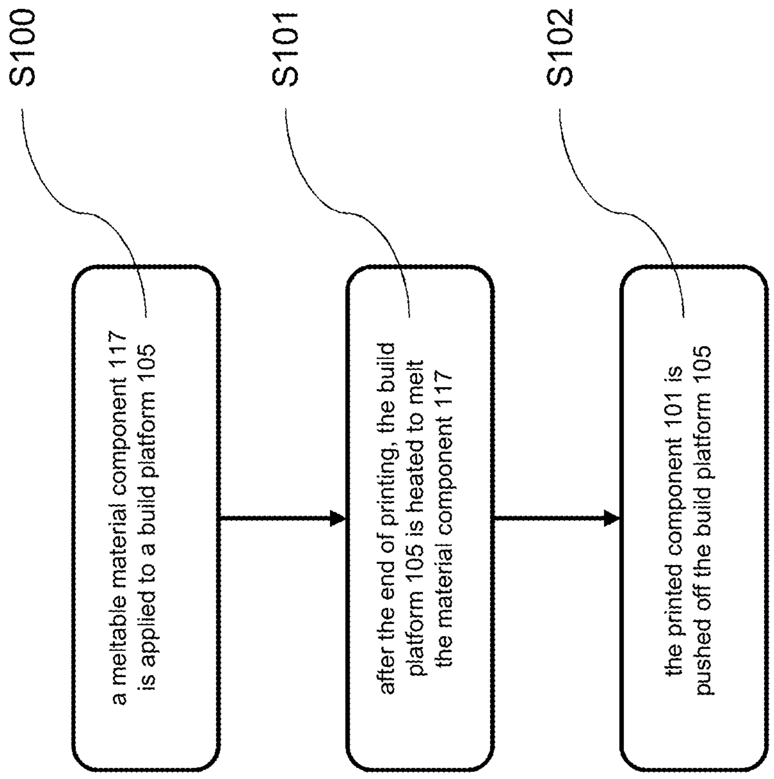
FIG. 8 shows a block diagram of a method for printing a three-dimensional component.

FIG. 8 shows a block diagram of a method for printing the three-dimensional component. In step S100, a meltable material component 117 is applied to the build platform 105. The material component 117 can be applied as a layer on the build platform 105 or can be integrated into a support structure 103 of the component 105. After the end of printing, the build platform 105 is heated in step S101 to melt the material component 117. This creates a sliding film 125 between the component 101 and the build platform 105. In step S102, the component 101 is pushed off the build platform 105.

The method allows finished printed components 101 to be automatically removed from the build platform 105 after the print job has been completed. This makes the build platform 105 ready for the next component 101. This enables continuous printing of components 101 without manual intervention.

All the features explained and shown in connection with individual embodiments of the invention can be provided in different combinations in the subject matter according to the invention in order to simultaneously realize their advantageous effects.

All method steps can be implemented by devices that are suitable for executing the respective method step. All functions performed by the features of the subject matter can be a method step of a method.

The scope of protection of the present invention is given by the claims and is not limited by the features explained in the description or shown in the figures.

REFERENCE LIST

100 Printing device
101 Component or object
103 Support structure
105 Build platform
107 Heater or heating device
109 Pushing evacuator or pushing device
111 Remover or removal device
113 Blade
115 Applicator or application device
117 Meltable material or material component
119 Cooler or cooling device
121 Slot dispenser
123 Flap
125 Sliding film
127 Shaft
128 Squeegee
129 Printing nozzle

The invention claimed is:

1. A method for printing a three-dimensional object, comprising:
applying a meltable material comprising polyethylene glycol, polyvinyl acetate, paraffin, or wax to a build platform;
building a support structure on the meltable material;
printing an object on the support structure;
heating the build platform to melt the meltable material to form a sliding film between the support structure supporting the printed object and the build platform; and
removing the printed object from the build platform.

2. The method according to claim 1,
wherein the meltable material is arranged extensively over the entire build platform or selectively beneath the support structure of the printed object.

3. The method according to claim 1,
wherein the printed object and the support structure are pushed off the build platform on the sliding film.

4. The method according to claim 1,
wherein the meltable material is removed from the build platform after removal of the printed object.

5. The method according to claim 1,
wherein the build platform is cooled after removal of the printed object.

6. A build platform for a printing device for carrying out the method according to claim 1 comprising
a heater for melting a meltable material to form a sliding film between a support structure for a printed three-dimensional object and the build platform.

7. A printer for printing the three-dimensional object, comprising the build platform according to claim 6.

8. The printer according to claim 7, comprising
an applicator for applying the meltable material to the build platform.

9. The printer according to claim 7, comprising
a pushing evacuator for pushing the object off the build platform.

10. The printer according to claim 7, comprising
an opening in a housing of the printer for ejecting the object.

11. The printer according to claim 8, comprising
a remover for removing the sliding film from the build platform.

12. The printer according to claim 11,
wherein the remover is formed by a blade.

* * * * *